May 31, 1932.  H. BRACE  1,860,650
METALLIC CORNER OR JOINT
Filed July 13, 1927

INVENTOR.
HARRY BRACE
BY Thos. Donnelly
ATTORNEY.

Patented May 31, 1932

1,860,650

UNITED STATES PATENT OFFICE

HARRY BRACE, OF DETROIT, MICHIGAN

METALLIC CORNER OR JOINT

Application filed July 13, 1927. Serial No. 205,293.

My invention relates to a new and useful improvement in metallic corners or joints adapted for use on furniture of various kinds for the purpose of securing rungs or brace members to supporting members regardless of the shape of the rungs or the supporting members.

It is an object of the present invention to provide a device of this class which will be simple in structure, economical of manufacture and highly efficient in use.

Another object of the invention is the provision of a securing device of this class which may be quickly and firmly secured upon a supporting member or brace and adapted for attaching to the cooperating supporting member or brace.

It is another object of the invention to provide a means of securing a supporting member or brace to a cooperating supporting member or brace without necessitating the drilling of any holes or inserting either of the cooperating parts into the other.

Another object of the invention is the provision of a device of this class in which a firm and secure joint may be made and in which a considerable saving, particularly in labor, may be accomplished.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of an article of furniture embodying the invention.

Figure 1:
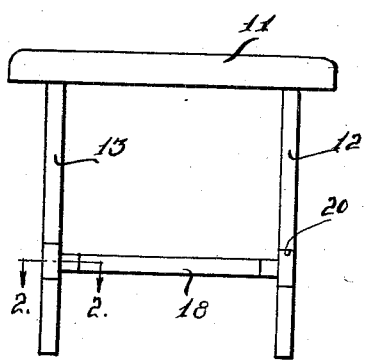
Figure 2:
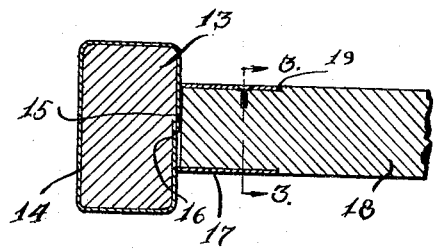
Fig. 2 is a fragmentary sectional view taken on line 2—2 of Fig. 1.
Figure 3:
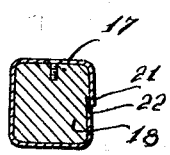
Fig. 3 is a sectional view taken on line 3—3 of Fig. 2.

In the drawings I have illustrated the invention applied to an article of furniture having a seat 11 supported by standards 12 and 13. The invention, in this instance, comprises a strip of metal 14 which is pressed around the support 13, and its overlapping ends 15 and 16 welded, soldered or otherwise suitably secured together, thus forming a coating of metal for the support. A strip of metal 17 is folded around the brace 18 which serves to connect the supports 12 and 13, this strip being positioned in a recess 19 formed in the brace 18, the support 12 being also provided with a recess 20 for the reception of the metal 14. The overlapping ends 21 and 22 of this strip are soldered, welded, or otherwise suitably secured together. The end of the strip 17 which engages against the strip 14 is welded, soldered, or otherwise suitably secured to the strip 14 so as to further secure the overlapping ends of the strip 14 in position and provide a socket bearing member which projects outwardly from the strip 14 and serves to receive the end of the brace 18, this brace being secured in the socket thus formed by screws or in any other suitable manner. In this way a drilling of a hole in the supports 12 and 13 for the reception of the ends of the brace 18 is avoided, and a device provided which may be very easily and quickly mounted in position and which will serve as a secure support for the brace 18 and serve to securely connect the supports 12 and 13 to the opposite ends of the brace.

Such a method of attaching the brace to the supports is, in addition to the economy in assembly, a very desirable method of attachment, particularly should the brace 18 become broken and it become necessary to replace this brace.

Figure 4:
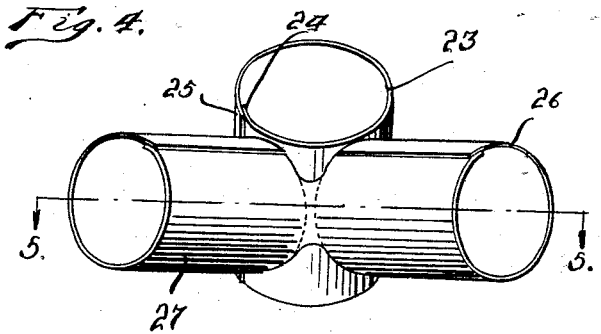
Fig. 4 is a perspective view of another form of the invention.
Figure 5:
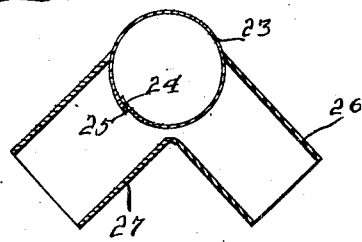
Fig. 5 is a sectional view taken on line 5—5 of Fig. 4.

In Fig. 4 I have shown a cylindrical sleeve 23 with its ends 24 and 25 overlapping for the reception of a suitable support. Similar cylindrical sleeves 26 and 27 are secured at one end to the periphery of the sleeve 23 and projecting outwardly therefrom for the reception of the braces.

Figure 6:
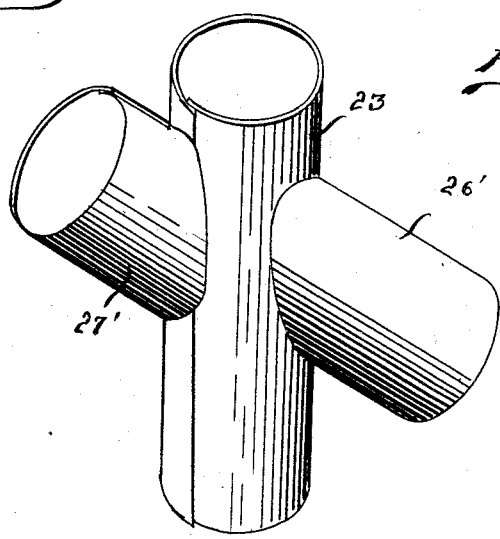
Fig. 6 is a perspective view of another form of the invention.

In Fig. 6 I have shown a sleeve 23' with the overlapping ends having the sleeves 26' and 27' projecting outwardly therefrom at an angle.

Figure 7:
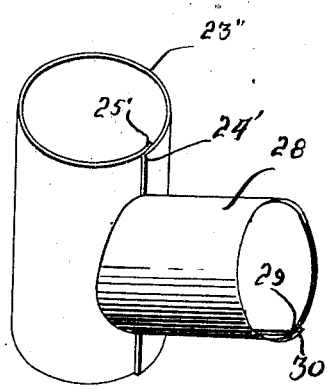
Fig. 7 is a perspective view of still another form of the invention.

In Fig. 7 I have shown the sleeve 23'' provided with the overlapping ends 24' and 25' with a single cylindrical sleeve 28 projecting outwardly therefrom, the ends 29 and 30 of this sleeve overlapping.

It is obvious that many changes in the form of the device may be made while still retaining the main portion which is mounted on the support and the socket bearing, outwardly projecting member which is secured on this main portion.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. The method of constructing a brace joiner for mounting on a supporting member consisting in forming a tubular member from sheet metal and overlapping and fastening its ends and forming a brace receiving member in tubular formation from a single sheet of metal overlapping and securing its edges and attaching one end of said brace receiving member to the periphery of said first mentioned tubular member.

2. A furniture brace of the class described, adapted for securing, on articles of furniture, the ends of braces on supporting members and comprising: a strip of metal adapted to be positioned about a supporting member in embracing relation, the ends of said strip overlapping each other and being secured together; a tubular retaining member secured at one end to the periphery of said strip and projecting outwardly therefrom for the reception of one end of a brace, said periphery closing said end of said retaining member.

3. A furniture brace of the class described, adapted for securing, on articles of furniture, the ends of braces on supporting members and comprising: a strip of metal adapted to be wound about a supporting member and having its ends over-lapping and secured together and adapted to retain said strip in fixed relation to said supporting member; a strip of metal adapted to be wound about one end of a brace, said strip having its edges over-lapped and secured together and having one end secured to the outer surface of the first strip of metal.

In testimony whereof I have signed the foregoing specification.

HARRY BRACE.